United States Patent
Beck et al.

[11] Patent Number: 6,135,610
[45] Date of Patent: Oct. 24, 2000

[54] ELECTRICAL PLUG CONNECTION IN A SUN VISOR FOR MOTOR VEHICLES

[75] Inventors: Frederick Beck, Folschviller; René Lecorvaisier, Hombourg-Haut, both of France

[73] Assignee: Becker Group Europe GmbH, Wuppertal, Germany

[21] Appl. No.: 08/887,734

[22] Filed: Jul. 3, 1997

Related U.S. Application Data

[63] Continuation of application No. 08/674,191, Jul. 1, 1996.

[30] Foreign Application Priority Data

Jul. 1, 1995 [DE] Germany .......................... 195 24 064

[51] Int. Cl.$^7$ ...................................................... B60R 1/12
[52] U.S. Cl. .......................... 362/142; 362/394; 362/492; 296/97.5; 296/97.12
[58] Field of Search ................................. 296/97.2, 97.5, 296/97.9, 97.12, 97.13; 362/135, 140, 141, 142, 144, 492, 494, 394

[56] References Cited

U.S. PATENT DOCUMENTS

| | | | |
|---|---|---|---|
| 4,363,511 | 12/1982 | Viertel et al. | 296/97.5 |
| 4,984,137 | 1/1991 | Maemura | 362/492 |
| 5,188,446 | 2/1993 | Miller | 362/144 |
| 5,205,639 | 4/1993 | White et al. | 362/142 |
| 5,320,399 | 6/1994 | White et al. | 296/97.12 |
| 5,331,518 | 7/1994 | Roark et al. | 362/144 |
| 5,498,056 | 3/1996 | Viertel et al. | 296/97.5 |
| 5,533,776 | 7/1996 | Agro et al. | 296/97.9 |

FOREIGN PATENT DOCUMENTS

| | | |
|---|---|---|
| 3338279 | 2/1985 | Germany . |
| 92016219 | of 1992 | Germany . |
| 4031482 | 9/1992 | Germany . |

*Primary Examiner*—Alan Cariaso
*Attorney, Agent, or Firm*—Harness, Dickey & Pierce, P.L.C.

[57] ABSTRACT

A motor vehicle sun visor having a generally flat sun visor body usually of foamed plastic material, having an approximately rectangular peripheral contour. In one corner region of the sun visor body, a mounting housing is disposed in the body. The housing has a bore which extends approximately parallel to the upper longitudinal edge of the sun visor body. An end region of the sun visor support and mounting shaft is received in that bore. A plug-in opening to that bore intersects it at approximately a right angle. A plug disposed in the visor body is positioned to plug into the plug-in opening. Electrical wires supported on the sun visor shaft have external contact elements. Electric contacts on the plug are contactable with the contact elements on the sun visor shaft. The plug has electrically contactable elements away from the shaft. A microswitch on the visor includes contact pins which contact the contactable elements on the plug. The switch is fastened on a mirror cassette which is disposed on the sun visor body. The switch is operated by a cover over the mirror cassette which operates the switch to close the circuit to an illuminating device associated with the visor.

19 Claims, 5 Drawing Sheets

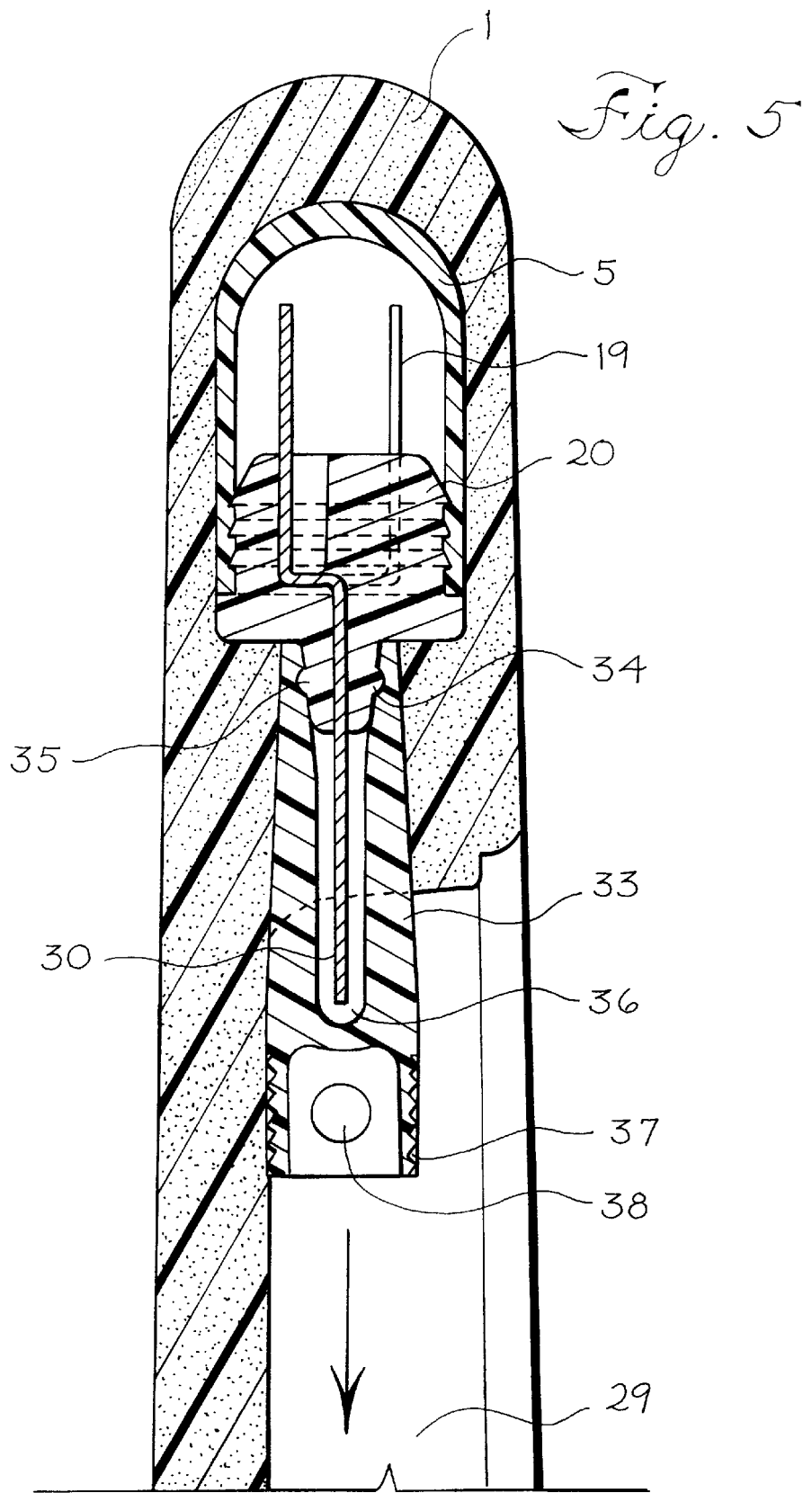

ELECTRICAL PLUG CONNECTION IN A SUN VISOR FOR MOTOR VEHICLES

This application is a continuation of application Ser. No. 08/674,191, filed Jul. 1, 1996 now abandoned.

BACKGROUND OF THE INVENTION

The present invention relates to an electric current transmitting plug in a sun visor for motor vehicles. The sun visor includes a flat sun visor body comprised of foamed plastic and having an approximately rectangular peripheral contour, and the body has an incorporated strengthening insert. The body has a mounting housing in a corner region. The housing has a bore which extends approximately parallel to the upper longitudinal edge of the sun visor body. The bore receives an end region of a sun visor support shaft. The visor body has a plug-in opening that extends approximately at a right angle to the bore in the housing for receiving a plug. The sun visor shaft is provided with enclosed electric wires. At the region of the end of the shaft on the mounting housing side, the shaft has two external contact elements. The plug is comprised of a plastic injection molding. It has electric contact elements which are held by the extrusion of the plug around the contact elements. The end regions of the contact elements extend at one of their ends beyond the plug for forming contact springs which can be contacted with the sun visor shaft and this brings electric current to the contact springs.

A sun visor of this type is known from Federal Republic of Germany Published Application No. 40 31 482 A1. In that known sun visor, current for powering an illuminating device on the sun visor body is fed through insulated electric wires. The electric wires are bared at their ends, which are soldered on the one hand to the contact elements which act on the sun visor shaft and are also soldered on the other hand to contact pins of a microswitch. Solder points, however, are relatively expensive to produce. Further, in practice, they constitute the only constantly recurring places of disturbance which can no longer be eliminated because they are located within the foam material of the sun visor body. A disturbance in the electric wiring system of a sun visor, which is found upon the final inspection, almost always means that the entire sun visor must be scrapped.

SUMMARY OF THE INVENTION

It is an object of the present invention to provide a sun visor of the aforementioned type with particularly highly reliable electric connecting means within the sun visor body.

This object is achieved in accordance with the invention. A motor vehicle sun visor has a generally flat sun visor body, usually formed of foamed plastic material, having an approximately rectangular peripheral contour. In one corner region of the sun visor body, a mounting housing is disposed in the body. The housing has a bore which extends approximately parallel to the upper longitudinal edge of the sun visor body. An end region of the sun visor support and mounting shaft is received in that bore. There is a plug-in opening to that bore which intersects the bore at approximately a right angle. A plug is disposed in the visor body and is positioned to plug into the plug-in opening. Electrical wires are supported on the sun visor shaft and have external contact elements. The plug has first electric contacts which are contactable with the contact elements on the sun visor shaft. The plug further has second electric contact elements away from the shaft. A switch on the visor, preferably a microswitch, includes contact pins which contact the second contact elements on the plug. That switch is preferably fastened on a mirror cassette which is disposed on the sun visor body. The switch is preferably operated by moving a cover over the mirror cassette which operates the switch to close the circuit to an illuminating device associated with the visor.

The measures of the invention have the advantage of absolutely reliable operation. The invention provides a substantial improvement in sun visor quality and is easy to assemble and is inexpensive.

Other features and advantages of the present invention will become apparent from the following description of the invention which refers to the accompanying drawings.

BRIEF DESCRIPTION OF THE DRAWINGS

Embodiments of the invention will be explained further below, with reference to the drawings, in which:

FIG. 5 is a section through the sun visor body during one phase of its manufacture.

DETAILED DESCRIPTION OF THE INVENTION

Figure 1:
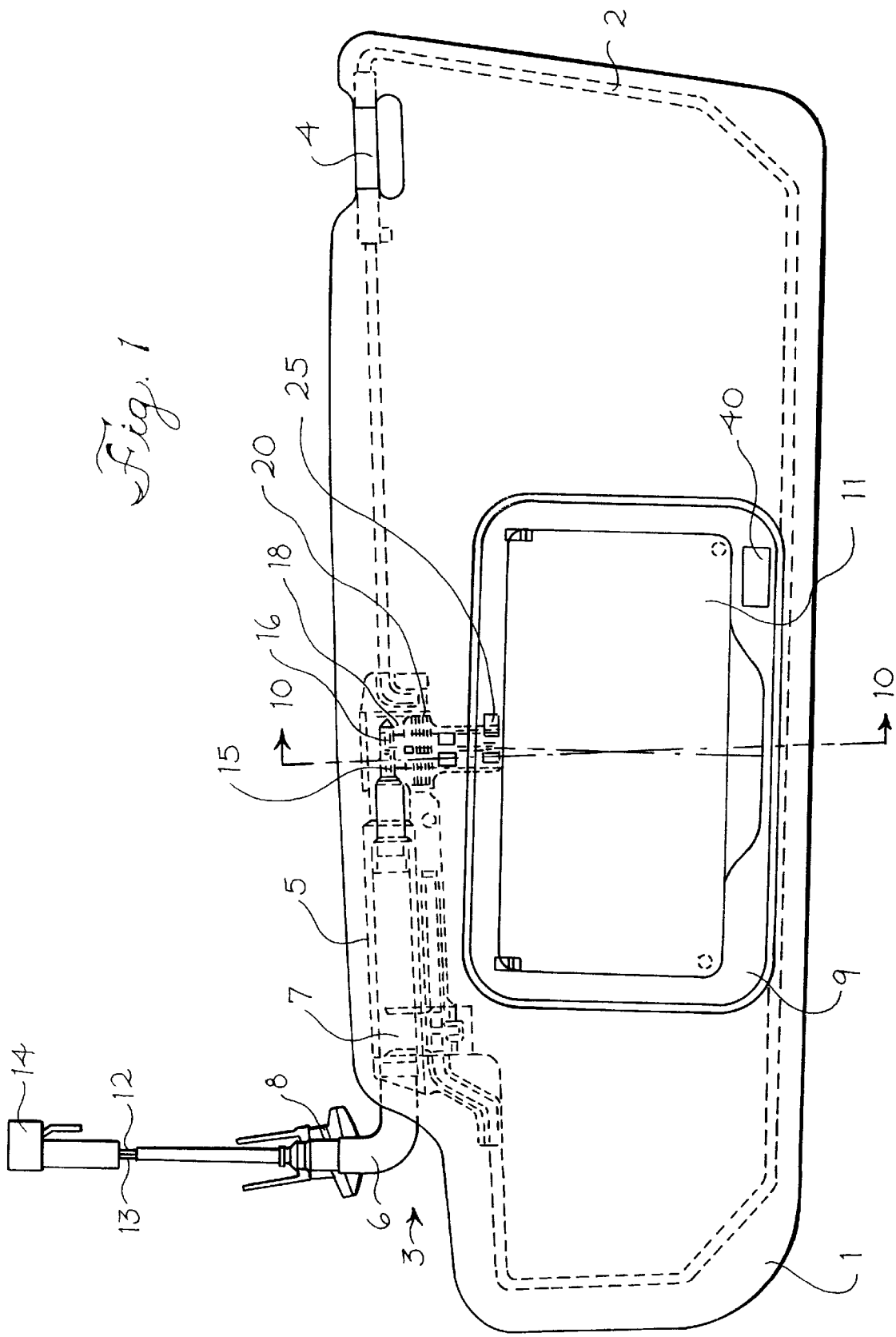
FIG. 1 is a plan view of a sun visor showing its essential functional parts arranged within a sun visor body.

FIG. 1 shows a flat, generally rectangular peripheral contour sun visor having a sun visor body 1 of foamed plastic, which is stiffened by an internal reinforcing insert 2 of wire. For swingably supporting the sun visor body 1 in a motor vehicle, a swivel mount 3 is provided toward one corner of the visor body. An outer support pin 4 toward the opposite end of the visor body from the swivel mount cooperates with an outer support bracket, not shown, in the vehicle to enable the visor body to swing.

The swivel mount 3 includes a mounting housing 5 which is embedded in the visor body 1 and forms a unit with the stiffening insert 2. A sun visor shaft 6 of L-shape includes a long arm installed in the bore of the housing 5. A U-shaped detent spring 7 radially clamps the exterior of the long arm of the sun visor shaft 6 while the shaft is in the housing 5. The short arm of the sun visor shaft 6 is mounted for turning in a mounting bracket 8 which can be fastened to the vehicle body. This enables the sun visor body 1 to also be swung toward the side window of the vehicle. The construction of the sun visor shaft will not be further described since it is known, for instance, from Federal Republic of Germany 41 18 913 C1.

The sun visor body 1 has a recess 29 defined in one surface. A mirror cassette 9 is received in the recess. The cassette has a mirror 10 which, when it is not being used, can be covered by a cover 11. The sun visor also includes an illuminating device 40 which is arranged optionally spaced from the sun visor body, for instance in the ceiling of the vehicle, or is conventionally in the sun visor body 1, e.g., on the frame of the mirror cassette. It is connected to be operated by the below described switch 25.

Electric current for the illuminating device is supplied via the general electrical system of the vehicle, so that the illuminating device can be connected to the electrical system of the vehicle. In the embodiment shown in FIG. 1, two electric wires 12, 13 pass through the sun visor shaft 6. At one end the wires are attached to a plug 14. At the other end the wires end in contact elements 15, 16.

Figure 2:
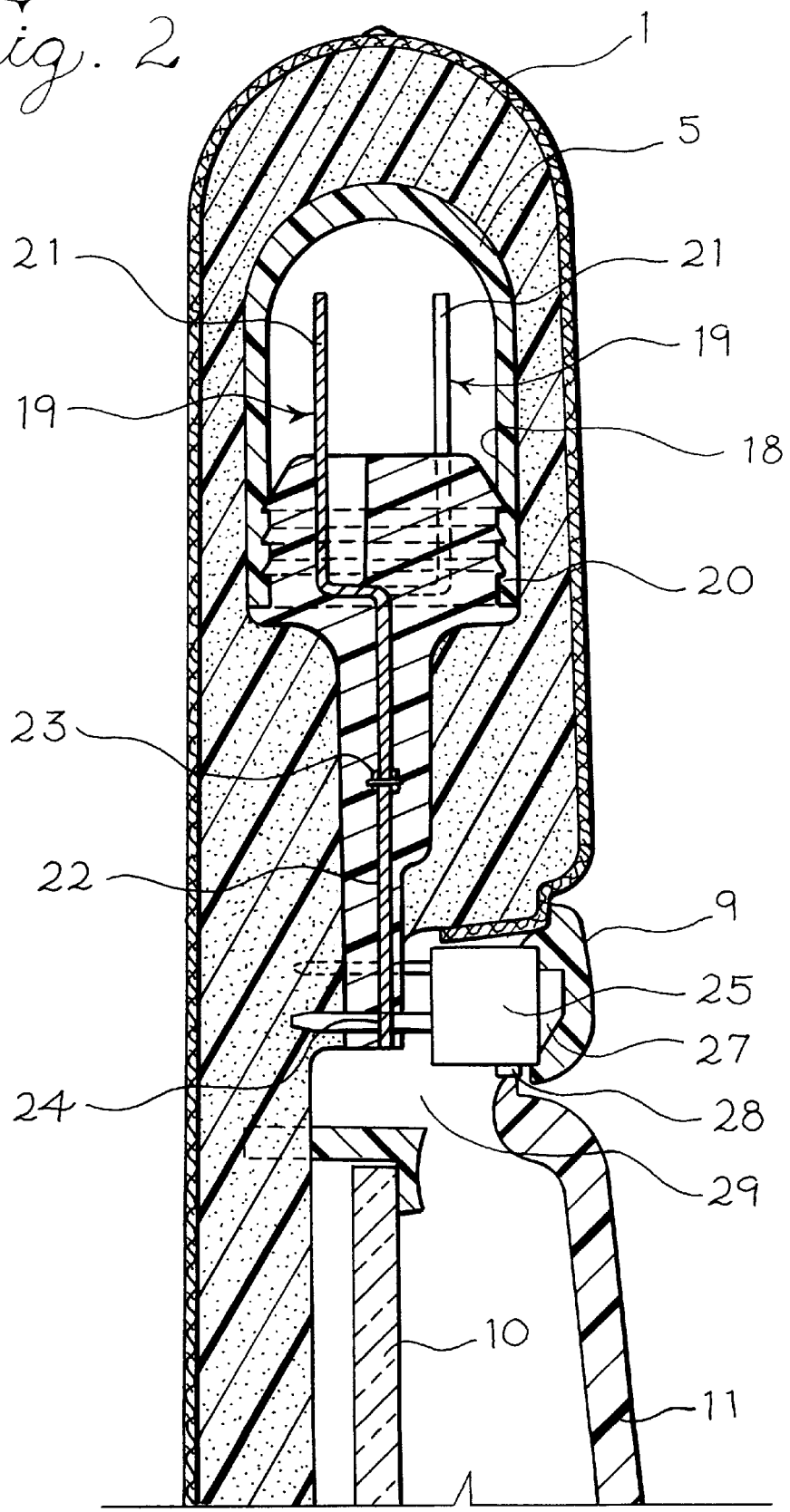
FIG. 2 is a part of the section along the line A—A in FIG. 1, shown on a larger scale.
Figure 3:
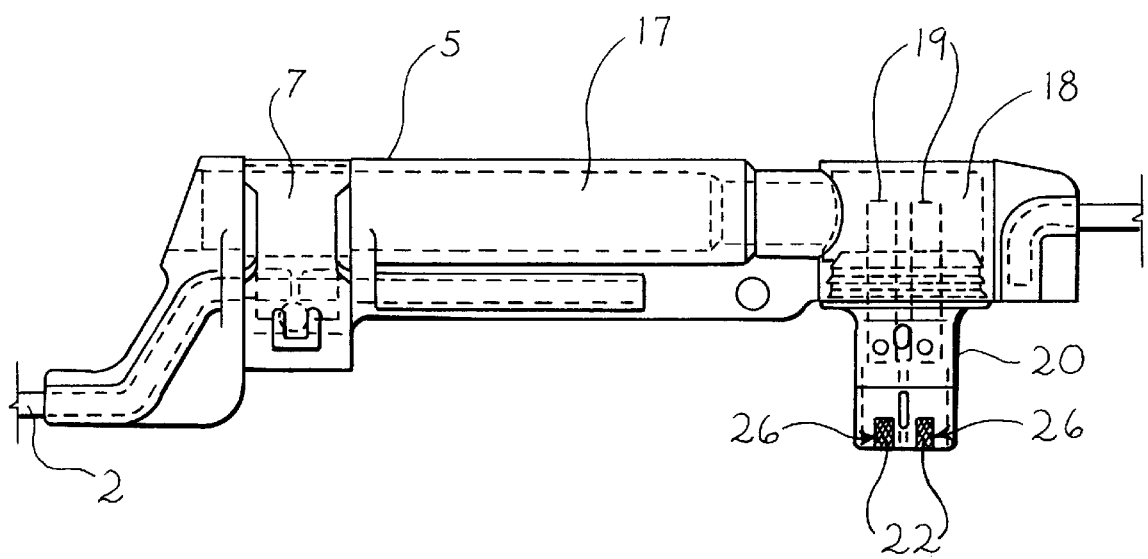
FIG. 3 is an enlarged view of the mounting housing.

The mounting housing 5 is preferably developed as a plastic injection molding. It has a bore 17 into which a plug-in opening 18 exits at approximately a right angle. The bore 17 receives a plug 20 that supports contact elements 19. The plug 20 includes a plastic injection molding, and the contact elements 19 are attached to the plug 20 by extrusion around the elements. Each of the contact elements 19 shown in FIGS. 2 and 3 has a metal strip 21 of non-ferrous metal and a stranded wire 22, which may comprise copper braiding, connected to it at one end, for instance by welding. The metal strips 21 protrude beyond one end of the plug 20 and form, with the contact elements 15, 16 on the shaft 6, contact springs which contact the sun visor shaft 6. The stranded wires 22 terminate flush with the bottom of the plug 20 and are embedded almost completely in the material of the plug. To make the flexible wires accessible to the contact pins 24 of a microswitch 25, the plug 20 has window like openings 26.

A microswitch 25 is clipped into a recess 27 in the mirror frame which forms part of the mirror cassette 9. The mirror cassette 9 can be mounted, for instance, according to the teaching of Federal Republic of Germany Application No. 43 02 607 A1. This brings the contact pins 24 of the microswitch 25 into contact with the stranded wires 22. But the pins 24 pass through the stranded wires 22, which assures a reliable contact. The microswitch 25 is actuated by the opening and closing of the cover 11, which acts against the switch actuating knob 28.

Figure 4:
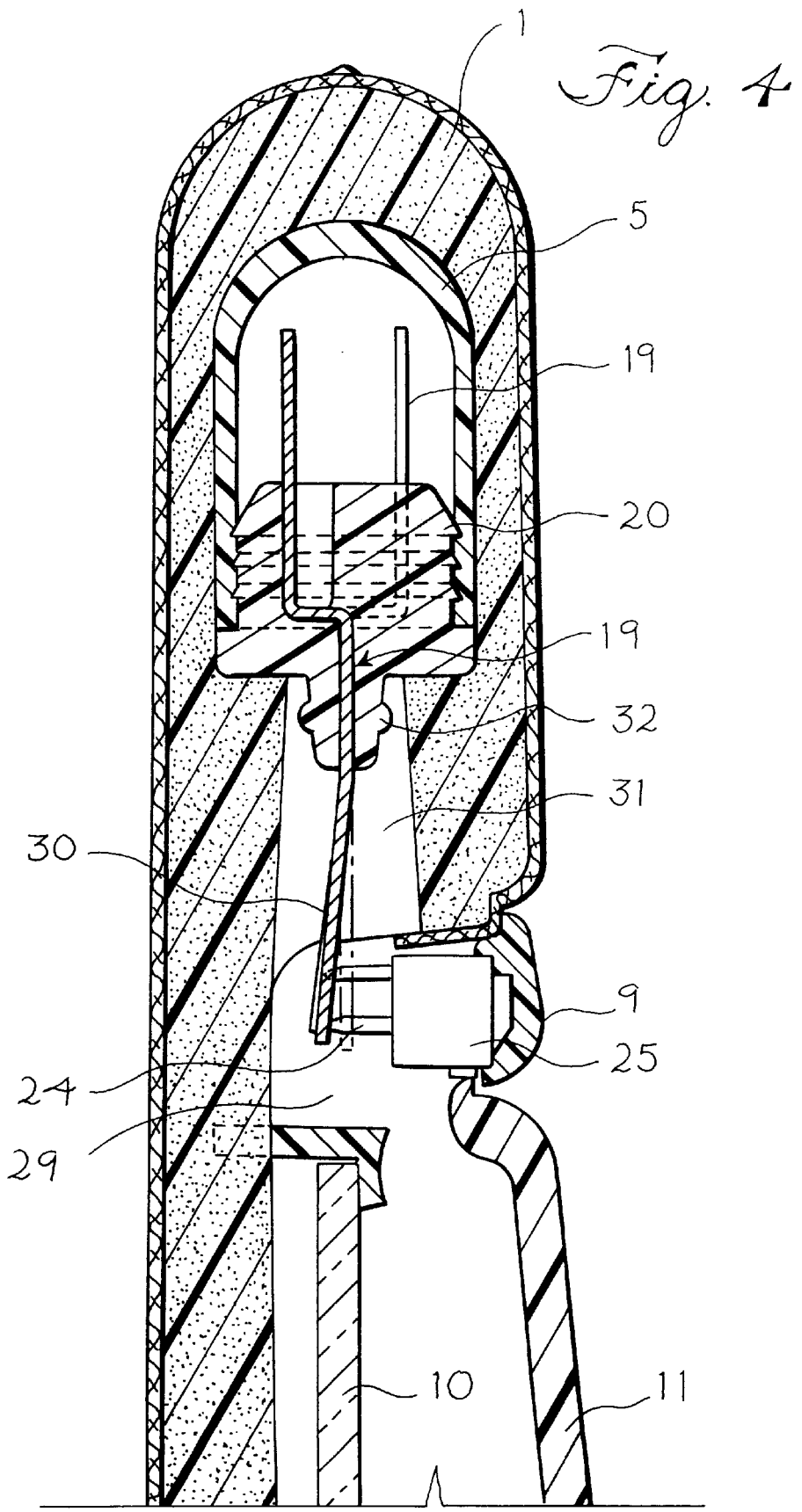
FIG. 4 is a section along the line A—A of FIG. 1, on an enlarged scale showing an embodiment which is modified as compared with FIG. 2.

In the alternate embodiment shown in FIG. 4, the contact elements 19 extend beyond the plug 20 both by upper contact springs and by lower contact springs 30. The lower contact springs 30 are contained within an opening 31 in the sun visor body 1 where they are kept free of foam. The opening 31 exits into the recess 29 in the sun visor body 1 which receives the mirror cassette 9. Upon mounting of the mirror cassette 9, the contact pins 24 of the microswitch 25 contact the lower contact springs 30 to bend the springs 30 out of their linearly extending position in FIG. 5 in order to then lie, with permanent spring tension, against the contact springs 24, as shown in FIG. 4.

The plug 20 is developed integrally with a pin 32 on the end of the plug facing away from the mounting housing 5. The pin 32 detachably holds a temporary use auxiliary plug 33. Upon the foaming of the sun visor body 1, the plug 33 keeps the opening 31 free of foam and protects the contact springs 30. For dependable holding, the pin 32 is developed with an annular bead 34, while the auxiliary plug 33 is developed with an annular groove 35 which can be clipped over that bead. The auxiliary plug 33 has an internal opening 36, which is closed at its bottom, to receive the lower contact springs 30.

After the foaming of the visor body, the auxiliary plug 33 is removed from the pin 32 to expose the contact springs 30. The plug is pulled into the recess 29 in the direction of the arrow in FIG. 5. To facilitate this, the auxiliary plug includes surfaces for action by a removal tool, such as grooves 37 and/or holes 38. The auxiliary plug 33 can advantageously be reused again so that it does not increase the cost of manufacture of the sun visor.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sun visor for motor vehicles comprising
   a substantially flat sun visor body, the body having a corner region;
   a mounting housing at the corner region of the visor body;
   a bore defined in the mounting housing; a plug-in opening intersecting the bore;
   a sun visor shaft having a first end region which is received in the bore of the mounting housing, and the shaft having a second end region for supporting the shaft and therefore the sun visor body in a vehicle;
   electric wires extending along the sun visor shaft, the wires including a first end electrically connectible into the vehicle electric system first contact elements connected to the electric wires and located on the shaft in the bore generally at the plug-in opening;
   a plug supported in the visor body at the plug-in opening; second electric contact elements supported by the plug and shaped and positioned to define contact springs which are contactable with the first contact elements for supplying electric current to the second contact elements; the second contact elements having electrically contactable regions;
   an electric switch supported on the sun visor body, the switch having contact pins which engage the contactable regions of the second contact elements plug, the switch being connectible with an electrically operated device in the vehicle, such that operation of the switch brings electric current to the electrically operable device from the second contact elements.

2. The sun visor of claim 1, further comprising a mirror cassette with a mirror and supported on the sun visor body; the switch being connected with the mirror cassette and being operable for activating the electrical device when the mirror cassette is operated for viewing the mirror.

3. The sun visor of claim 2, wherein the electrical device is an illuminating device which is activated by the mirror cassette.

4. The sun visor of claim 3, wherein the mirror cassette further comprises a movable mirror cover supported at the mirror cassette on the sun visor body; the switch having an operator positioned for being operated by the mirror cover as the mirror cover is moved to expose the mirror to view, for operating the switch to activate the illuminating device.

5. The sun visor of claim 1, wherein the mounting housing is in the sun visor body.

6. The sun visor of claim 5, wherein the sun visor body is comprised of foamed plastic material.

7. The sun visor of claim 1, wherein the sun visor body is comprised of foamed plastic material.

8. The sun visor of claim 1, wherein the sun visor body has an approximately rectangular peripheral contour with the corner region.

9. The sun visor of claim 8, wherein the mirror body has an upper longitudinal edge, and the mounting housing is oriented so that the bore thereof extends approximately parallel to the upper longitudinal edge of the sun visor body.

10. The sun visor of claim 9, wherein the plug-in opening extends approximately at a right angle to the bore of mounting housing, and the plug is outside the bore of the mounting housing.

11. The sun visor of claim 1, wherein the plug is comprised of a plastic injection molding and the second electric contact elements are held in the plug by extrusion of the plug around the second contact elements.

12. The sun visor of claim 1, wherein the plug surrounds the second contact elements therein, the contact springs comprise metal strips for contacting the sun visor shaft and the electrical contactable regions comprise stranded wires; the switch including contact pins which extend to the contactable regions of the second contact elements.

13. The sun visor of claim 1, wherein the contactable regions of the second contact elements are outside the bore of the mounting housing; the switch including contact pins and the contact pins of the switch extend toward and engage the contactable regions.

14. The sun visor of claim 13, further comprising openings in the plug for providing access to the contactable elements, and the switch contact pins being positioned and extending through the openings in the plug to contact the contactable elements therein.

15. The sun visor of claim 14, wherein a first recess is defined within the sun visor body through which the contactable elements extend, a second recess being defined in the sun visor body in which the mirror cassette is disposed, the first recess opening into the second recess, and the contactable elements extending toward the mirror cassette; the switch being at the mirror cassette, the switch contact pins engaging the contactable elements of the plug.

16. The sun visor of claim 1, wherein a first recess is defined within the sun visor body through which the contactable elements extend, a second recess being defined in the sun visor body in which the mirror cassette is disposed, the first recess opening into the second recess, and the contactable elements extending toward the mirror cassette; the switch being at the mirror cassette, the switch contact pins engaging the contactable elements of the plug.

17. The sun visor of claim 16, wherein the plug includes mounting means thereon for detachably supporting an auxiliary plug, and the auxiliary plug being selectively attachable to and detachable from the mounting means on the plug;

the auxiliary plug being shaped for covering over the contactable elements and also for defining the first recess in the visor body which is free of foam during the formation of the visor body.

18. The sun visor of claim 17, wherein the mounting means for the auxiliary plug comprises a mounting pin on the plug and cooperating means on the auxiliary plug for engaging the mounting pin.

19. The sun visor of claim 18, wherein the mounting pin on the plug includes an annular bead thereon and the cooperating means on the auxiliary plug includes an annular groove clippable over the annular bead on the plug and removable therefrom for separating the auxiliary plug from the plug.

* * * * *